(12) United States Patent
Parkhurst et al.

(10) Patent No.: US 7,869,774 B1
(45) Date of Patent: Jan. 11, 2011

(54) RF SATURATION VOLTAGE SENSOR

(75) Inventors: Ray M. Parkhurst, Hillsboro, OR (US);
Ede Enobakhare, Beaverton, OR (US);
Jin W. Cho, Hillsboro, OR (US)

(73) Assignee: TriQuint Semiconductor, Inc.,
Hillsboro, OR (US)

( * ) Notice: Subject to any disclaimer, the term of this patent is extended or adjusted under 35 U.S.C. 154(b) by 626 days.

(21) Appl. No.: 11/770,232

(22) Filed: Jun. 28, 2007

(51) Int. Cl.
*H04B 1/04* (2006.01)
(52) U.S. Cl. .................................. 455/127.1; 455/115.1
(58) Field of Classification Search ............... 455/115.1, 455/115.3, 115.4, 126, 127.1, 127.2
See application file for complete search history.

(56) References Cited

U.S. PATENT DOCUMENTS

| | | | | |
|---|---|---|---|---|
| 4,780,625 A | * | 10/1988 | Zobel | ......................... 327/53 |
| 5,666,077 A | * | 9/1997 | Fournel et al. | ................ 327/80 |
| 7,433,658 B1 | * | 10/2008 | Shirvani-Mahdavi et al. | ....................... 455/127.2 |
| 2004/0002322 A1 | * | 1/2004 | Krupezevic et al. | ......... 455/323 |
| 2004/0189398 A1 | * | 9/2004 | Noh et al. | ................... 330/296 |

* cited by examiner

*Primary Examiner*—Nhan Le
(74) *Attorney, Agent, or Firm*—Booth Udall, PLC

(57) ABSTRACT

An apparatus and method is disclosed for providing a sensor circuit to detect when an output stage of a radio frequency (RF) power amplifier is driven into a non-linear saturation region and provide an output detection signal that is representative of the degree of saturation of the output stage. The sensor circuit includes a detection element operably coupled with an output stage and a reference voltage element operably coupled with the detection element, the reference voltage element is capable of providing an output detection signal.

21 Claims, 3 Drawing Sheets

RF SATURATION VOLTAGE SENSOR

TECHNICAL FIELD OF THE INVENTION

Embodiments of the present invention relate generally to radio frequency (RF) power amplifiers and more specifically, to a RF saturation voltage sensor for maintaining linearity in a RF power amplifier.

BACKGROUND OF THE INVENTION

Radio frequency (RF) power amplifiers are often used in various portable applications, such as, for example, cellular telephones and other wireless devices. In these applications, the RF power amplifiers are designed to operate into an optimal load impedance and are typically coupled to an antenna of the wireless device.

However, under a load mismatch condition, such as, for example, when the antenna of the wireless device approaches objects (e.g., metal structures, human contact, or the like), the load impedance of the RF power amplifier changes and is no longer optimal, and the RF power amplifier may be driven into a non-linear saturation region. The RF power amplifier may also be driven into a non-linear saturation region under a low voltage condition, such as, for example, when the battery of a battery-operated wireless device is discharged.

When a RF power amplifier is driven into the non-linear saturation region, the output signal of the RF power amplifier is clipped, causing severe signal distortion. The non-linear saturation region and this severe signal distortion are undesirable. In addition, the adjacent channel power ratio (ACPR) and error vector magnitude (EVM) linearity and distortion limits are often exceeded when the RF power amplifier is driven into the non-linear saturation region. This is also undesirable.

BRIEF DESCRIPTION OF THE DRAWINGS

The novel features believed to be characteristic of embodiments of the invention are set forth in the appended claims. However, embodiments of the invention will best be understood by reference to the following detailed description when read in conjunction with the accompanying drawings, wherein embodiments of the invention are illustrated by way of example, and not by way of limitation, in the figures of the accompanying drawings in which like reference numerals refer to similar elements.

DETAILED DESCRIPTION OF THE INVENTION

Reference will now be made to the following detailed description of the exemplary embodiments of the present invention. Those skilled in the art will recognize that embodiments of the present invention provide many inventive concepts and novel features that are merely illustrative and not to be construed as restrictive. Accordingly, the specific embodiments discussed herein are given by way of example and do not limit the scope of the embodiments of the present invention. In addition, those skilled in the art will understand that for purposes of explanation, numerous specific details are set forth, though embodiments of the invention can be practiced without these specific details, and that certain features have been omitted so as to more clearly illustrate embodiments of the invention.

Figure 1:
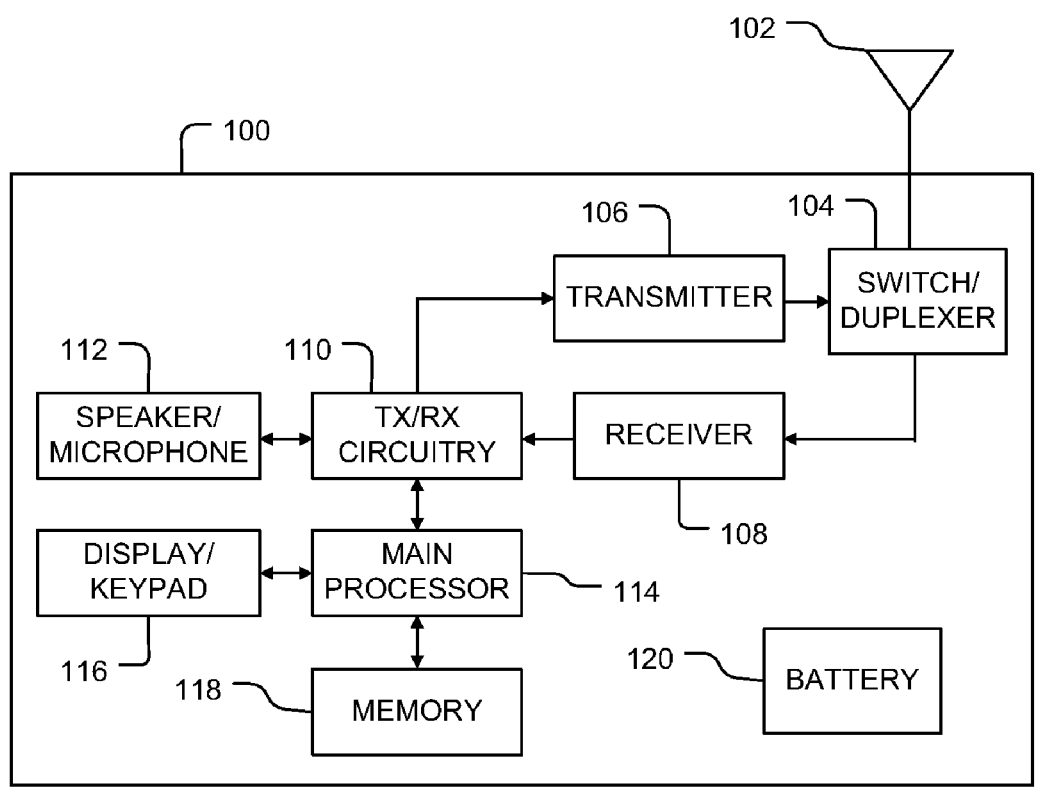
FIG. 1 illustrates a high-level block diagram of a wireless device according to an exemplary embodiment of the present invention.

FIG. 1 illustrates a high-level block diagram of a wireless device 100 according to an exemplary embodiment of the present invention. In one embodiment of the present invention, wireless device 100 comprises an antenna 102, a switch/duplexer 104, a transmitter 106, a receiver 108, TX/RX circuitry 110, a speaker/microphone 112, a main processor 114, a display/keypad 116, a memory 118, and a battery 120. Wireless device 100 may be any wireless device, including, but not limited to, conventional cellular telephones, paging devices, personal digital assistant devices, text-messaging devices, portable computers, or any other like device capable of wireless communication.

As will be explained below in greater detail, transmitter 106 comprises radio frequency (RF) power amplifier circuitry including one or more RF saturation voltage sensors, one or more RF power amplifier stages, and other like circuitry. In one embodiment of the present invention, the RF power amplifier circuitry of transmitter 106 is formed on a Gallium Arsenide (GaAs) substrate. However, other semiconductor materials (e.g., silicon, indium phosphide, gallium nitride) may be used. In addition, for purposes of illustration and ease of explanation, embodiments of the present invention are described in terms of bipolar junction transistor (BJT) technology (e.g., heterojunction bipolar transistors (HBTs)). However, embodiments of the invention may be practiced using other transistor technology, including, for example, but not limited to, field effect transistor (FET) technology (e.g., metal-semiconductor field effect transistors (MESFETs) and pseudomorphic high electron mobility transistors (pHEMTs)) or complementary metal-oxide semiconductor (CMOS) technology.

TX/RX circuitry 110 receives from antenna 102 an incoming signal transmitted by, for example, a communication system or a wireless network provider, through switch/duplexer 104 and receiver 108. TX/RX circuitry 110 processes and sends the incoming signal to the speaker (i.e., voice data) or to main processor 114 (e.g., web browsing) for further processing. Likewise, TX/RX circuitry 110 receives analog or digital voice data from the microphone or other outgoing data (e.g., web data, e-mail) from main processor 114. TX/RX circuitry 110 transmits an RF signal that is transmitted through transmitter 106 via antenna 102.

Main processor 114 executes a basic operating system program stored in memory 118 in order to control the overall operation of wireless device 100. For example, main processor 114 controls the reception of signals and the transmission of signals by TX/RX circuitry 110, receiver 108, and transmitter 106. Main processor 114 is capable of executing other processes and programs resident in memory 118 and may move data into or out of memory 118, as required by an executing process.

Main processor 114 is also coupled to display/keypad 116. The user of wireless device 100 uses the keypad to enter data into wireless device 100. The display may be a liquid crystal display capable of rendering text and/or at least various graphics; alternate embodiments may use other types of displays. Battery 120 is operably coupled with the electrical components of wireless device 100, in accordance with known electrical principles.

Those skilled in the art will recognize that wireless device 100 is given by way of example and that for simplicity and clarity, only so much of the construction and operation of wireless device 100 as is necessary for an understanding of the present invention is shown and described. For example, wireless device 100 is capable of communicating using one or more of a number of conventional standards, including, but not limited to GSM/EDGE, CDMA, W-CDMA, or the like. In addition, or as an alternative, although an exemplary wireless device 100 is shown and described, embodiments of the present invention contemplate any suitable component or combination of components performing any suitable tasks in association with wireless device 100, according to particular needs. Moreover, it is understood that wireless device 100 should not be construed to limit the types of devices in which embodiments of the present invention may be implemented.

In accordance with the principles of embodiments of the present invention, the RF power amplifier circuitry of transmitter 106 provides for detecting non-linearity and adjusting the RF power amplifier circuitry so that it is not driven into a non-linear saturation region, as described below in greater detail with respect to FIGS. 2-4.

Figure 2:
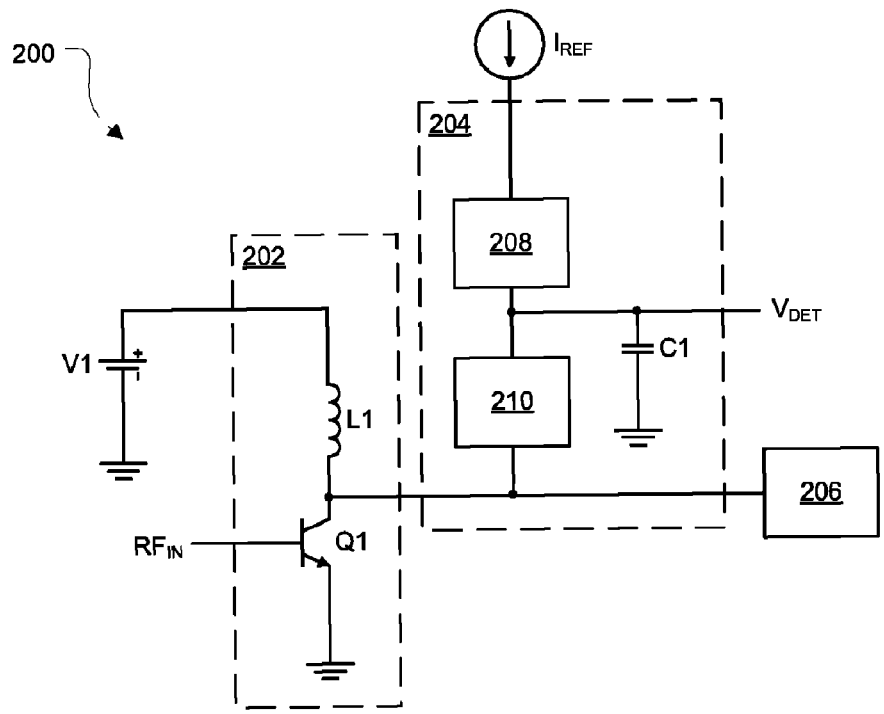
FIG. 2 illustrates a schematic diagram of a RF saturation voltage sensor according to one embodiment of the present invention.

FIG. 2 illustrates a schematic diagram of a RF saturation voltage sensor 200 according to one embodiment of the present invention. RF saturation voltage sensor 200 comprises an output stage 202, a sensor circuit 204, a supply voltage V1, a current source reference current $I_{REF}$, a $RF_{IN}$ signal, and an output load 206. Output stage 202 comprises a transistor Q1 and an inductor L1. For simplicity and clarity, only a single transistor Q1 and a single inductor L1 are shown and described. Although output stage 202 is shown and described as having a single transistor Q1 and a single inductor L1, any number of transistors, inductors, or other components may be used.

Sensor circuit 204 comprises a capacitor C1, a reference voltage element 208, a detection element 210, and an output voltage detection signal $V_{DET}$. Capacitor C1, reference voltage element 208, and detection element 210 provide a sensing circuit, so that transistor Q1 is not driven into a non-linear saturation region. In addition, embodiments of the present invention provide for current source reference current $I_{REF}$ to provide a bias current for reference voltage element 208.

In one embodiment of the present invention, transmitter 106 of FIG. 1 comprises RF power amplifier circuitry, including RF saturation voltage sensor 200. In addition, or as an alternative, output stage 202 is an output stage of a RF power amplifier associated with the RF power amplifier circuitry of wireless device 100. Output stage 202 and, in particular, transistor Q1 may be driven by the $RF_{IN}$ signal via a RF driver stage or by TX/RX circuitry 110. In addition, output stage 202 may transmit the $RF_{IN}$ signal via load 206. In one embodiment of the present invention, load 206 may be an antenna and may be, for example, antenna 102 of FIG. 1.

In another embodiment of the present invention, reference voltage element 208 provides the ability to set the value of a threshold voltage of sensor circuit 204, i.e., the voltage at which detection element 210 turns-on and is activated to detect a threshold voltage level of the collector-emitter voltage ($V_{CE}$) of transistor Q1. In addition, when the collector-emitter voltage ($V_{CE}$) of transistor Q1 decreases below a threshold voltage level, sensor circuit 204 provides an output voltage detection signal $V_{DET}$. Output voltage detection signal $V_{DET}$ may activate external circuitry to maintain the linearity of transistor Q1, and thereby prevent transistor Q1 from being driven into a non-linear saturation region.

In another embodiment of the present invention, the collector-emitter voltage ($V_{CE}$) of transistor Q1 may decrease below a threshold level, such as, for example, during a load mismatch condition or a low voltage condition. Although a decrease in the collector-emitter voltage ($V_{SE}$) of transistor Q1 is described as a decrease in a voltage generated from a load mismatch condition or a low voltage condition, embodiments of the present invention contemplate any suitable mismatch or voltage condition. For example, a mismatch or voltage condition may be any condition that causes the collector-emitter voltage ($V_{CE}$) of transistor Q1 to decrease, thereby increasing the power consumption of transistor Q1, decreasing the battery life of, for example, battery 120 of FIG. 1, or exceeding the adjacent channel power ratio (ACPR) and error vector magnitude (EVM) limits of, for example, wireless device 100 of FIG. 1.

Therefore, in accordance with the principles of embodiments of the present invention, sensor circuit 204 detects when the collector-emitter voltage ($V_{CE}$) of transistor Q1 is driven into a non-linear saturation region, and sensor circuit 204 provides an output voltage detection signal $V_{DET}$ that is representative of the degree of saturation of transistor Q1. In addition, or as an alternative, output voltage detection signal $V_{DET}$ may be coupled with a device, or an integrated circuit, to reduce the output power level, adjust the bias level, adjust the load impedance, or otherwise adjust the circuit parameters to reduce the saturation level and thus maintain the linearity of transistor Q1 within specified limits.

Figure 3:
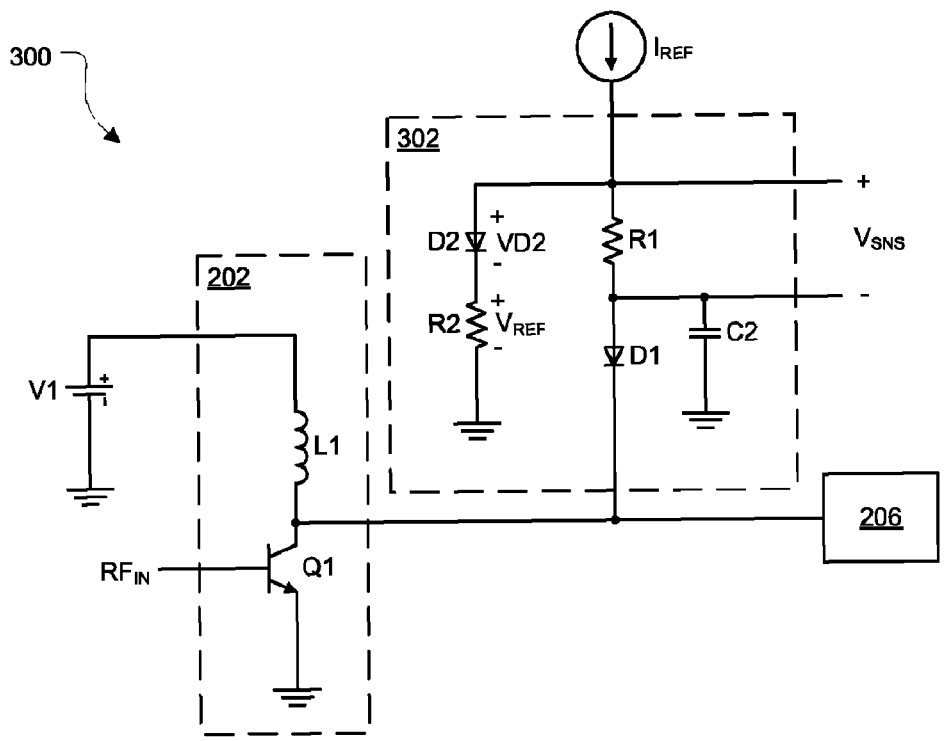
FIG. 3 illustrates a schematic diagram of a RF saturation voltage sensor according to another embodiment of the present invention.

FIG. 3 illustrates a schematic diagram of a RF saturation voltage sensor 300 according to another embodiment of the present invention. RF saturation voltage sensor 300 comprises output stage 202, a sensor circuit 302, supply voltage V1, current source reference current $I_{REF}$, a $RF_{IN}$ signal, and output load 206. As discussed above, output stage 202 comprises a transistor Q1 and an inductor L1 and may be, for example an RF power amplifier associated with the RF power amplifier circuitry of wireless device 100.

Sensor circuit 302 comprises diodes D1 and D2, resistors R1 and R2, a capacitor C2, and an output voltage sense signal $V_{SNS}$. In one embodiment of the present invention, current source reference current $I_{REF}$ provides a bias current for diode D2 and resistor R2. The bias current creates a reference voltage $V_{REF}$ across resistor R2 and a voltage VD2 across diode D2. In addition, as long as the collector-emitter voltage ($V_{SE}$) of transistor Q1 is above a threshold voltage, diode D1 is negatively biased and remains turned-off. However, when the collector-emitter voltage ($V_{CE}$) of transistor Q1 decreases below a threshold voltage, for example, when the collector-emitter voltage ($V_{CE}$) of transistor Q1 decreases to, or below, reference voltage $V_{REF}$, diode D1 turns-on and begins to conduct. Once diode D1 begins to conduct, the current in diode D1 also flows through resistor R1, which creates an output voltage sense signal $V_{SNS}$ across resistor R1.

In one embodiment of the present invention, transmitter 106 of FIG. 1 comprises RF power amplifier circuitry, including RF saturation voltage sensor 300. In addition or as an alternative, output stage 202 is an output stage of a RF power amplifier associated with the RF power amplifier circuitry of wireless device 100. Output stage 202 and, in particular, transistor Q1 may be driven by the $RF_{IN}$ signal via a RF driver stage or by TX/RX circuitry 110 of wireless device 100. In addition, output stage 202 may transmit the $RF_{IN}$ signal via load 206. In one embodiment of the present invention, load 206 may be an antenna and may be, for example, antenna 102 of FIG. 1.

To further explain the operation of RF saturation voltage sensor 300, an example is now given. In the following example, RF saturation voltage sensor 300 is formed on a Gallium Arsenide (GaAs) substrate. If RF saturation voltage sensor 300 is formed on a Gallium Arsenide (GaAs) substrate, the collector-emitter voltage ($V_{SE}$) of transistor Q1 may be, for example, approximately 3.5 v and the turn-on voltage of diodes D1 and D2 may be, for example, approximately 1.2 v. In this example, current source reference current $I_{REF}$ is set to 1 mA and the value of resistor R2 is 1 KΩ.

As discussed above, current source reference current $I_{REF}$ provides a bias current for diode D2 and resistor R2. Therefore, since the value of resistor R2 is 1 KΩ, the reference voltage $V_{REF}$ across resistor R2 is equal to 1 v (i.e., $V_{REF}=R2*I_{REF}$). In addition, diode D1 is negatively biased and remains turned-off, since, for example, the voltage at the cathode of diode D1 is equal to the collector-emitter voltage ($V_{CE}$) of transistor Q1, which in this example, is approximately 3.5 v. Since no current is flowing through diode D1 or resistor R1, the voltage at the anode of diode D1 is 2.2 v (i.e., $VD2+V_{REF}$).

However, once the collector-emitter voltage ($V_{CE}$) of transistor Q1 decreases below the threshold voltage (i.e., reference voltage $V_{REF}$ of 1 v) by, for example, a load mismatch or a decrease in supply voltage V1, diode D1 is positively biased and turns-on. Once diode D1 turns-on, current source reference current $I_{REF}$ also provides a bias current for diode D1 and resistor R1. The current source reference current $I_{REF}$ flows through resistor R1, diode D1, and through transistor Q1 to ground. In addition, since the current source reference current $I_{REF}$ is flowing through resistor R1, an output voltage sense signal $V_{SNS}$ is provided across resistor R1.

Although RF saturation voltage sensor 300 is described as being formed on a Gallium Arsenide (GaAs) substrate, embodiments of the present invention contemplate forming RF saturation voltage sensor 300 on any suitable semiconductor technology, as explained below in greater detail. In addition, although particular values are described in the above example for various components, any values may be used for those components.

The value of the threshold voltage of sensor circuit 302 is the voltage at which diode D1 turns-on and is activated to detect a threshold voltage level of the collector-emitter voltage ($V_{CE}$) of transistor Q1. As described above, this threshold voltage of sensor circuit 302 may be set by adjusting the value of resistor R2 or adjusting the value of current source reference current $I_{REF}$, or by adjusting both. Among other things, this provides the ability to maintain the power consumption of transistor Q1, increase the battery life of, for example, battery 120 of FIG. 1, and maintain the adjacent channel power ratio (ACPR) and error vector magnitude (EVM) limits of, for example, wireless device 100 of FIG. 1, within specified limits. Moreover, this provides the ability to reduce the saturation level and thus maintain the linearity of transistor Q1 within specified limits.

In another embodiment of the present invention, diode D2 and resistor R2 provide temperature compensation for RF saturation voltage sensor 300. Although a single diode D2 and a single resistor R2 are shown and described for compensating for the temperature variation of RF saturation voltage sensor 300, any number of diodes or resistors may be used. It is important to note that as the temperature changes, so does the voltage across diodes D1 and D2. Therefore, in order to maximize the temperature compensation nature of diodes D1 and D2, embodiments of the present invention provide for utilizing the same technology for each of diodes D1 and D2.

To further explain the temperature compensation of RF saturation voltage sensor 300, an example is now given. In the following example, the voltage across diodes D1 and D2 increases or decreases in proportion to the change in temperature of sensor circuit 302. For example, when the temperature increases in RF saturation voltage sensor 300, and in particular, when the temperature increases in diode D1 and D2, additional current flows through diodes D1 and D2 and resistor R2, thereby providing a substantially constant threshold voltage for sensor circuit 302. In addition, or as an alternative, when the temperature decreases in diodes D1 and D2, less current flows through diodes D1 and D2 and resistor R2, thereby providing a substantially constant threshold voltage for sensor circuit 302. Among other things, this provides the ability to reduce the variation in the threshold voltage of sensor circuit 302 and maintain the linearity of transistor Q1 with respect to temperature.

Therefore, in accordance with the principles of embodiments of the present invention, sensor circuit 302 detects when the collector-emitter voltage ($V_{CE}$) of transistor Q1 is driven into a non-linear saturation region, and sensor circuit 302 provides an output voltage sense signal $V_{SNS}$ that is representative of the degree of saturation of transistor Q1. In addition, embodiments of the present invention enable output voltage sense signal $V_{SNS}$ to trigger an external circuit (not shown) to prevent transistor Q1 from being driven into a non-linear saturation region. As an example only and not by way of limitation, output voltage sense signal $V_{SNS}$ may be used by an external power control circuit to reduce the output power level, adjust the bias level, adjust the load impedance, or otherwise adjust the circuit parameters to reduce the saturation level and thus maintain the linearity of transistor Q1 within specified limits.

Figure 4:
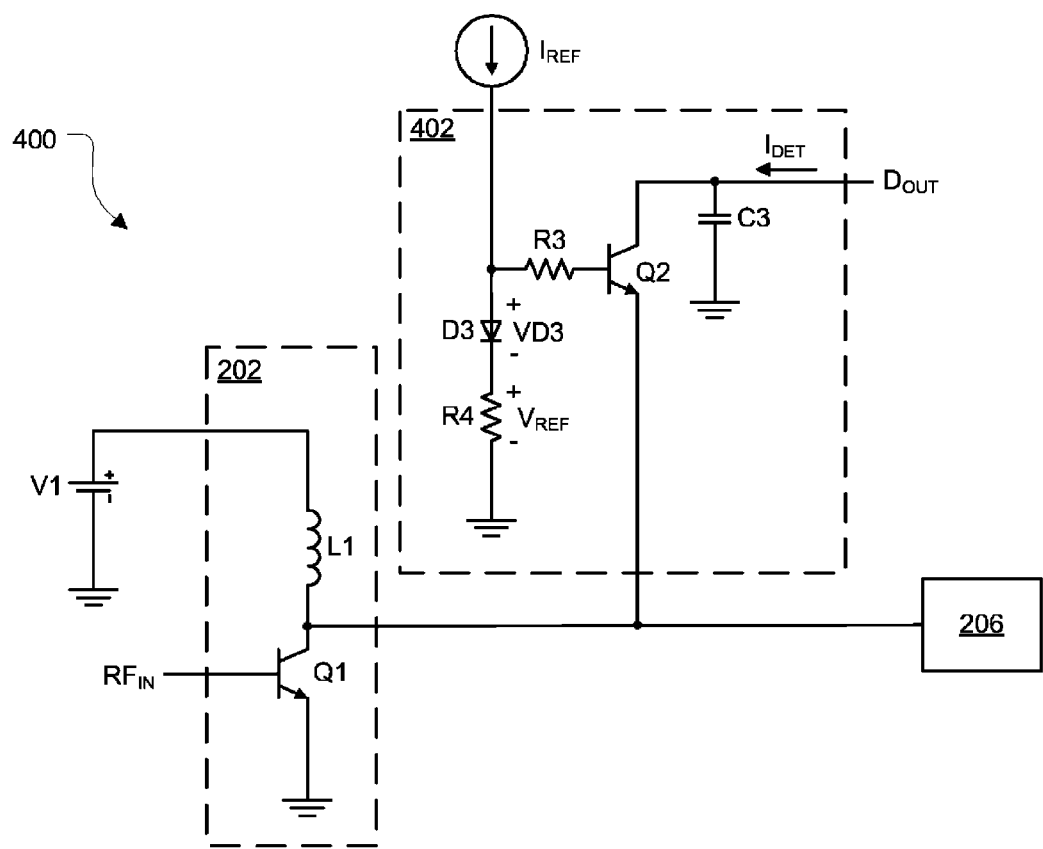
FIG. 4 illustrates a schematic diagram of a RF saturation voltage sensor according to another embodiment of the present invention.

FIG. 4 illustrates a schematic diagram of a RF saturation voltage sensor 400 according to another embodiment of the present invention. RF saturation voltage sensor 400 comprises an output stage 202, a sensor circuit 402, supply voltage V1, current source reference current $I_{REF}$, a $RF_{IN}$ signal, and output load 206. As discussed above, output stage 202 comprises a transistor Q1 and an inductor L1 and may be, for example an RF power amplifier associated with the RF power amplifier circuitry of wireless device 100.

Sensor circuit 402 comprises a diode D3, resistors R3 and R4, a transistor Q2, a capacitor C3, and an output detection signal $D_{OUT}$. In one embodiment of the present invention, current source reference current $I_{REF}$ provides a bias current for diode D3 and resistor R4. The bias current creates a reference voltage $V_{REF}$ across resistor R4 and a voltage VD3 across diode D3. In addition, as long as the collector-emitter voltage ($V_{CE}$) of transistor Q1 is above a threshold voltage, transistor Q2 remains turned-off. However, when the collector-emitter voltage ($V_{CE}$) of transistor Q1 decreases below a threshold voltage, for example, when the collector-emitter voltage ($V_{CE}$) of transistor Q1 decreases to, or below, reference voltage $V_{REF}$, transistor Q2 turns-on and begins to conduct. In addition, when the collector-emitter voltage ($V_{CE}$) of transistor Q1 decreases below a threshold voltage level, sensor circuit 402 provides an output detection signal $D_{OUT}$. Output detection signal $D_{OUT}$ may activate external circuitry to maintain the linearity of transistor Q1, and thereby prevent transistor Q1 from being driven into a non-linear saturation region.

In one embodiment of the present invention, transmitter 106 of FIG. 1 comprises RF power amplifier circuitry, including RF saturation voltage sensor 400. In addition or as an alternative, output stage 202 is an output stage of a RF power amplifier associated with the RF power amplifier circuitry of wireless device 100. Output stage 202 and, in particular, transistor Q1 may be driven by the $RF_{IN}$ signal via a RF driver stage or by TX/RX circuitry 110 of wireless device 100. In addition, output stage 202 may transmit the $RF_{IN}$ signal via load 206. In one embodiment of the present invention, load 206 may be an antenna and may be, for example, antenna 102 of FIG. 1.

In another embodiment of the present invention, once the collector-emitter voltage ($V_{CE}$) of transistor Q1 decreases below a threshold voltage by, for example, a load mismatch or a decrease in supply voltage V1, transistor Q2 turns-on. Once transistor Q2 turns-on, current source reference current $I_{REF}$ also provides a bias current for transistor Q2 via resistor R3. Detection current $I_{DET}$ flows through transistor Q2 through transistor Q1 to ground.

The value of the threshold voltage of sensor circuit 402 is the voltage at which transistor Q2 turns-on and is activated to detect a threshold voltage level of the collector-emitter voltage ($V_{CE}$) of transistor Q1. This threshold voltage of sensor circuit 402 may be set by adjusting the value of resistor R4 or adjusting the value of current source reference current $I_{REF}$, or by adjusting both. Among other things, this provides the ability to maintain the power consumption of transistor Q1, increase the battery life of, for example, battery 120 of FIG. 1, and maintain the adjacent channel power ratio (ACPR) and error vector magnitude (EVM) limits of, for example, wireless device 100 of FIG. 1, within specified limits. Moreover, this provides the ability to reduce the saturation level and thus maintain the linearity of transistor Q1 within specified limits.

In another embodiment of the present invention, diode D3 and resistor R4 provide temperature compensation for RF saturation voltage sensor 400. Although a single diode D3 and a single resistor R4 are shown and described for compensating for the temperature variation of RF saturation voltage sensor 400, any number of diodes or resistors may be used.

In another embodiment of the present invention, the voltage across diode D3 increases or decreases in proportion to the change in temperature of sensor circuit 402. For example, when the temperature increases in diode D3, additional current flows through diode D3 and resistor R4, thereby providing a substantially constant threshold voltage for sensor circuit 402. In addition, or as an alternative, when the temperature decreases in diode D3, less current flows through diode D3 and resistor R4, thereby providing a substantially constant threshold voltage for sensor circuit 402. Among other things, this provides the ability to reduce the variation in the threshold voltage of sensor circuit 402 and maintain the linearity of transistor Q1 with respect to temperature.

Therefore, in accordance with the principles of embodiments of the present invention, sensor circuit 402 detects when the collector-emitter voltage ($V_{CE}$) of transistor Q1 is driven into a non-linear saturation region, and sensor circuit 402 provides an output detection signal $D_{OUT}$ that is representative of the degree of saturation of transistor Q1. In addition, embodiments of the present invention provide the ability to trigger an external circuit (not shown) to prevent transistor Q1 from being driven into a non-linear saturation region. As an example only and not by way of limitation, output detection signal $D_{OUT}$ may be used by an external power control circuit to reduce the output power level, adjust the bias level, adjust the load impedance, or otherwise adjust the circuit parameters to reduce the saturation level and thus maintain the linearity of transistor Q1 within specified limits.

Embodiments of the present invention provide for the fabrication of RF saturation voltage sensors 200, 300, and 400 of FIGS. 2-4, respectively, using pseudomorphic high electron mobility transistor (pHEMT) technology, which is a semiconductor field effect transistor (FET) technology. However, RF saturation voltage sensors 200, 300 and 400 may be fabricated using other semiconductor FET technologies, including, for example, but not limited to, metal semiconductor field effect transistor (MESFET), junction field effect transistor (jFET), high electron mobility transistor (HEMT), metamorphic high electron mobility transistor (mHEMT), heterostructure field effect transistor (HFET), modulation-doped field effect transistor (MODFET), or any other suitable semiconductor FET technologies.

Semiconductor materials used to fabricate RF saturation voltage sensors 200, 300, and 400 may include materials, such as, for example, Gallium Arsenide (GaAs), Indium Phosphide (InP), Gallium Nitride (GaN), and derivatives of the foregoing, such as Aluminum Gallium Arsenide (AlGaAs), Indium Gallium Arsenide (InGaAs), Indium Gallium Phosphide (InGaP), Indium Aluminum Arsenide (InAlAs), Aluminum Gallium Nitride (AlGaN), Indium Gallium Nitride (InGaN), Gallium Arsenide Antimonide (GaAsSb), Indium Gallium Arsenide Nitride (InGaAsN), and Aluminum Arsenide (AlAs), for example. In one embodiment of the present invention, RF saturation voltage sensors 200, 300, and 400 are formed on a Gallium Arsenide (GaAs) substrate. However, RF saturation voltage sensors 200, 300, and 400 may be formed on other types of substrates, such as, for example, Indium Phosphide (InP) and Gallium Nitride (GaN).

Reference in the foregoing specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments of the present invention have been shown and described, it will be understood that various changes and modifications to the foregoing embodiments may become apparent to those skilled in the art without departing from the spirit and scope of the present invention. Accordingly, the invention is not limited to the embodiments disclosed, but rather by the appended claims and their equivalents.

What is claimed is:

1. A sensor circuit, comprising:
   a detection element operably coupled with an output stage, wherein the detection element comprises a first diode having a cathode and an anode, the anode of the first diode operably coupled with the output stage; and
   a reference voltage element operably coupled with the detection element, the reference voltage element capable of providing an output detection signal, and the cathode of the first diode operably coupled with the reference voltage element, wherein the reference voltage element comprises:
   a first resistor operably coupled with the cathode of the first diode;
   a second diode having a cathode and an anode, the cathode of the second diode operably coupled with the first resistor;
   a second resistor operably coupled between the anode of the second diode and a ground; and
   a capacitor operably coupled between the cathode of the first diode and the ground.

2. The circuit of claim 1, further comprising a current source reference current operably coupled with the second diode and the first resistor.

3. The circuit of claim 2, wherein the output detection signal is a voltage sense signal provided across the first resistor.

4. The circuit of claim 3, wherein the sensor circuit is capable of detecting a decrease in voltage of the output transistor and in response, providing the voltage sense signal across the first resistor that is representative of a degree of saturation of the output stage.

5. The circuit of claim 1, wherein the output stage is capable of amplifying a radio frequency (RF) signal.

6. The circuit of claim 5, wherein the output stage is operably coupled to an output load.

7. The circuit of claim 6, wherein the output stage comprises:
  an output transistor having a base and a collector, the collector of the output transistor operably coupled with the output load; and
  at least one inductor operably coupled between the collector of the output transistor and a voltage.

8. The circuit of claim 7, wherein the voltage is a battery voltage.

9. The circuit of claim 1, wherein the sensor circuit is fabricated in Gallium Arsenide (GaAs).

10. The circuit of claim 1, wherein the sensor circuit is fabricated in a semiconductor field effect transistor technology selected from the group consisting of:
  pseudomorphic high electron mobility transistor;
  metal semiconductor field effect transistor;
  junction field effect transistor;
  high electron mobility transistor;
  metamorphic high electron mobility transistor;
  heterostructure field effect transistor; and
  modulation-doped field effect transistor.

11. The circuit of claim 10, wherein the semiconductor technology includes material selected from the group consisting of:
  Gallium Arsenide;
  Indium Phosphide;
  Gallium Nitride;
  Aluminum Gallium Arsenide;
  Indium Gallium Arsenide;
  Indium Gallium Phosphide;
  Indium Aluminum Arsenide;
  Aluminum Gallium Nitride;
  Indium Gallium Nitride;
  Gallium Arsenide Antimonide;
  Indium Gallium Arsenide Nitride; and
  Aluminum Arsenide.

12. A sensor circuit, comprising:
  a detection element operably coupled with an output stage, wherein the detection element comprises a transistor having a base and an emitter, the emitter of the transistor operably coupled with the output stage; and
  a reference voltage element operably coupled with the detection element, the reference voltage element capable of providing an output detection signal, and the base of the transistor operably coupled with the reference voltage element, wherein the reference voltage element comprises:
    a first resistor operably coupled with the base of the transistor;
    a diode having a cathode and an anode, the cathode of the diode operably coupled with the first resistor;
    a second resistor operably coupled between the anode of the second diode and a ground; and
    a capacitor operably coupled between a collector of the transistor and the ground.

13. The circuit of claim 12, further comprising a current source reference current operably coupled with the cathode of the diode and the first resistor.

14. The circuit of claim 13, wherein the sensor circuit is capable of detecting a decrease in voltage of the output transistor and in response, providing the output detection signal at the collector of the transistor that is representative of a degree of saturation of the output stage.

15. The circuit of claim 12, wherein the output stage is capable of amplifying a radio frequency (RF) signal.

16. The circuit of claim 15, wherein the output stage is operably coupled with an output load.

17. The circuit of claim 16, wherein the output stage comprises:
  an output transistor having a base and a collector, the collector of the output transistor operably coupled with the output load; and
  at least one inductor operably coupled between the collector of the output transistor and a voltage.

18. The circuit of claim 17, wherein the voltage is a battery voltage.

19. The circuit of claim 12, wherein the sensor circuit is fabricated in Gallium Arsenide (GaAs).

20. The circuit of claim 12, wherein the sensor circuit is fabricated in a semiconductor field effect transistor technology selected from the group consisting of:
  pseudomorphic high electron mobility transistor;
  metal semiconductor field effect transistor;
  junction field effect transistor;
  high electron mobility transistor;
  metamorphic high electron mobility transistor;
  heterostructure field effect transistor; and
  modulation-doped field effect transistor.

21. The circuit of claim 20, wherein the semiconductor technology includes material selected from the group consisting of:
  Gallium Arsenide;
  Indium Phosphide;
  Gallium Nitride;
  Aluminum Gallium Arsenide;
  Indium Gallium Arsenide;
  Indium Gallium Phosphide;
  Indium Aluminum Arsenide;
  Aluminum Gallium Nitride;
  Indium Gallium Nitride;
  Gallium Arsenide Antimonide;
  Indium Gallium Arsenide Nitride; and
  Aluminum Arsenide.

* * * * *